United States Patent
Hovmalm et al.

(10) Patent No.: US 10,009,699 B2
(45) Date of Patent: Jun. 26, 2018

(54) METHOD FOR DIAGNOSING SEALING PROPERTIES OF MICROPHONE AND/OR LOUDSPEAKER SEALS IN AN ELECTRONIC DEVICE

(71) Applicant: Sony Mobile Communications Inc., Tokyo (JP)

(72) Inventors: Claes Hovmalm, Södra Sandby (SE); Georges Siotis, Lund (SE); Henrik Antonsson, Malmö (SE)

(73) Assignee: Sony Mobile Communications Inc., Tokyo (JP)

( * ) Notice: Subject to any disclaimer, the term of this patent is extended or adjusted under 35 U.S.C. 154(b) by 0 days. days.

(21) Appl. No.: 15/374,062

(22) Filed: Dec. 9, 2016

(65) Prior Publication Data
US 2017/0180896 A1    Jun. 22, 2017

(30) Foreign Application Priority Data
Dec. 17, 2015 (EP) .................................... 15200834

(51) Int. Cl.
H04R 29/00    (2006.01)

(52) U.S. Cl.
CPC ........... *H04R 29/00* (2013.01); *H04R 29/001* (2013.01); *H04R 29/004* (2013.01); *H04R 2430/03* (2013.01)

(58) Field of Classification Search
CPC .... H04R 29/00; H04R 29/001; H04R 29/004; H04R 2499/11; H04R 1/00; H04M 1/03; H04M 1/035; G01N 29/00
USPC ... 381/56, 58, 59, 92, 97, 98, 104, 111, 122, 381/355, 386
See application file for complete search history.

(56) References Cited

U.S. PATENT DOCUMENTS

| | | | | | |
|---|---|---|---|---|---|
| 5,572,443 | A | * | 11/1996 | Emoto | H03G 5/165 381/101 |
| 7,509,180 | B2 | * | 3/2009 | Abrams, Jr. | G06F 21/10 381/117 |
| 2009/0116666 | A1 | * | 5/2009 | Ranta | H04R 3/04 381/107 |
| 2011/0212755 | A1 | | 9/2011 | Ishikawa | |
| 2012/0294450 | A1 | * | 11/2012 | Ozcan | H04R 3/007 381/59 |
| 2013/0329899 | A1 | * | 12/2013 | Miseki | H04R 29/001 381/59 |

(Continued)

FOREIGN PATENT DOCUMENTS

WO    2011079875 A1    7/2011

OTHER PUBLICATIONS

European Search Report from corresponding European Application No. 15200834.8, dated Jun. 23, 2016.

(Continued)

*Primary Examiner* — Xu Mei
*Assistant Examiner* — Friedrich W Fahnert
(74) *Attorney, Agent, or Firm* — Tucker Ellis LLP

(57) ABSTRACT

A method for diagnosing sealing properties of microphone and/or loudspeaker seals in an electronic device. Sealing properties of the microphone and/or loudspeaker seals are diagnosed by comparing a representation of a total impulse response signal associated with certain stimuli with a representation of a predetermined reference total impulse response signal associated with the electronic device.

13 Claims, 2 Drawing Sheets

(56) References Cited

U.S. PATENT DOCUMENTS

2015/0327412 A1    11/2015   Ely

OTHER PUBLICATIONS

Anonymous: "Test and Measurement Applications: Acoustic Transducer Testing", Sep. 17, 2015, XP055280682, Retrieved from the Internet: URL:https://web.archive.org/web/20150917230530/http://www.prismsound.com/test_measure/support_subs/apps/acoustic_transducer_testing.php.

Anonymous: "Test and Measurement Applications: Impulse Response Testing", Sep. 21, 2015, XP055280683, Retrieved from the Internet: URL:https://web.archive.org/web/20150921145823/https://www.prismsound.com/test_measure/support_subs/apps/impulse_response.php.

* cited by examiner

METHOD FOR DIAGNOSING SEALING PROPERTIES OF MICROPHONE AND/OR LOUDSPEAKER SEALS IN AN ELECTRONIC DEVICE

TECHNICAL FIELD

The present invention relates to a method for diagnosing sealing properties of microphone and/or loudspeaker seals in an electronic device.

BACKGROUND

When producing water resistant electronic devices units, sealing of microphones and loudspeakers of the electronic device must be made. Examples of such electronic devices are mobile phones, tablets, laptops and smart watches. Since the water resistant electronic device then becomes hermetically closed, the interior of the electronic device acts as an acoustical chamber. Although the sealing of the loudspeakers and the microphones, besides providing water resistance, also sonically seals the loudspeakers and the microphones from acoustical chamber, sound energy produced by the loudspeakers will find its way to the microphones through the acoustical chamber introducing so called raw echo. The raw echo may introduce problems with sound echo recorded by the microphones. An echo canceller may be used to cancel out such sound echo signal recorded by the microphone.

However, if a sealing of a microphone or loudspeaker is not fully functional, besides reduced water resistance, also an increase in the recording of raw echo by the microphone may be introduced. The increase in raw echo experienced by the microphone may be due a bad sealing of the loudspeaker leading to increased leakage of sound emitted by the loudspeaker into the electronic device acting as the acoustical chamber. Alternately or in combination, the increase in raw echo experienced by the microphone may be due a bad sealing of the microphone leading to increased leakage of raw echo out from the electronic device acting as the acoustical chamber to the microphone.

It is hard and expensive to examine an electronic device in order to find such bad sealing of a microphone and/or a loudspeaker. When performing an acoustical diagnosis of an electronic device by letting it play a sound stimuli from a loudspeaker to a microphone, the location and acoustic properties of the recording location is unknown. The acoustic properties of the environment the electronic device is located in very much influence how the sound stimulus is presented by the microphone. Is the electronic device in a small room that will amplify certain frequencies? Is it near a wall inducing sound reflections rendering the results more or less unusable? Hence, there is a need for a method for diagnosing if a loudspeaker or microphone sealing is not fully functional.

SUMMARY OF THE INVENTION

It is an object of the present invention to solve at least one of the problems mentioned above.

According to a first aspect a method for diagnosing sealing properties of microphone and/or loudspeaker seals in an electronic device is provided. The method comprising a) emitting, from a loudspeaker of the electronic device, a sound stimuli based on a sweeping frequency described by one or more continuous time vs. frequency functions; b) recording, by a microphone of the electronic device, a sound response simultaneously with the emitting of the sound stimuli; c) convolving the sound response with a representation of the one or more continuous time vs. frequency functions, thereby obtaining a preliminary impulse response signal representing a preliminary impulse response correlation between the sound response and the representation of the one or more continuous time vs. frequency functions over time; d) determining, using the preliminary impulse response signal, a propagation delay through the electronic device; e) selecting, based on the propagation delay, a part of the sound response corresponding in time to the sound stimuli; f) convolving the part of the sound response corresponding in time to the sound stimuli with the representation of the one or more continuous time vs. frequency functions, thereby obtaining a total impulse response signal representing a total impulse response correlation between the part of the sound response corresponding in time to the sound stimuli and the representation of the one or more continuous time vs. frequency functions over time; and d) diagnosing sealing properties of a microphone sealing of the electronic device and/or sealing properties of a loudspeaker sealing of the electronic device, wherein the microphone sealing is arranged at an interface between the microphone and a housing of the electronic device and wherein the loudspeaker sealing is arranged at an interface between the loudspeaker and the housing of the electronic device, by comparing a representation of the total impulse response signal with a representation of a predetermined reference total impulse response signal associated with the electronic device.

The present method provide for a method of excluding external factors of the electronic device when performing the diagnosing. Hence, the playback-record process only comprises the electronic device itself, regardless of how it's surrounding environment. Based on the results from this method it is possible to determine which microphone or loudspeaker seal is leaking, wrongly mounted, missing or otherwise performing inadequeately-Hecen the method provide for effectively giving a verdict and recommending a replacement of the failing gasket/grommet/sealing/isolation subassembly. Using the method e.g. a customer services shop may easily proceed to change the failing gasket/grommet/sealing/isolation subassembly if that is indicated by the diagnosing. When the repair procedure is finalized, the repair operator can once again verify the results by running the diagnosing again and see if indeed the repair was effective.

The abobe method may e.g. be implemented as an application on the electronic device.

The representation of the one or more continuous time vs. frequency functions may be an inverse filter represented as an in time reversed version of the sound stimuli.

The inverse filter may further be defined by an over time changing amplitude.

The comparing of the representation of the total impulse response signal with the representation of the predetermined reference total impulse response signal associated with the electronic device may comprise transforming the total impulse response signal from the time domain to a frequency domain; and in the frequency domain, comparing the total impulse response signal with a frequency domain representation of the predetermined reference total impulse response signal.

The transforming of the total impulse response signal from the time domain to the frequency domain may be made using a Fourier Transformation, preferably a Discrete Fourier Transformation.

A minimum frequency range for the one or more continuous time vs. frequency functions may be at least one octave.

The at least one of the one or more continuous time vs. frequency functions may be a logarithmic function.

The electronic device may comprise a plurality of loudspeakers and/or a plurality of microphones, wherein the electronic device is provided with a microphone seal at each interface between one of the pluralities of microphones and the housing and with a loudspeaker seal at each interface between one of the pluralities of loudspeakers and the housing, and wherein acts a)-g) are repeated for microphone and loudspeaker combinations of the electronic device.

According to a second aspect a non-transitory computer-readable recording medium is provided. The non-transitory computer-readable recording medium having recorded thereon a program which when executed on an electronic device having processing capabilities is arranged for implementing: a) emitting, from a loudspeaker of the electronic device, a sound stimuli based on a sweeping frequency described by one or more continuous time vs. frequency functions; b) recording, by a microphone of the electronic device, a sound response simultaneously with the emitting of the sound stimuli; c) convolving the sound response with a representation of the one or more continuous time vs. frequency functions, thereby obtaining a preliminary impulse response signal representing a preliminary impulse response correlation between the sound response and the representation of the one or more continuous time vs. frequency functions over time; d) determining, using the preliminary impulse response signal, a propagation delay through the electronic device; e) selecting, based on the propagation delay, a part of the sound response corresponding in time to the sound stimuli; f) convolving the part of the sound response corresponding in time to the sound stimuli with the representation of the one or more continuous time vs. frequency functions, thereby obtaining a total impulse response signal representing a total impulse response correlation between the part of the sound response corresponding in time to the sound stimuli and the representation of the one or more continuous time vs. frequency functions over time; and d) diagnosing sealing properties of a microphone sealing of the electronic device and/or sealing properties of a loudspeaker sealing of the electronic device, wherein the microphone sealing is arranged at an interface between the microphone and a housing of the electronic device and wherein the loudspeaker sealing is arranged at an interface between the loudspeaker and the housing of the electronic device, by comparing a representation of the total impulse response signal with a representation of a predetermined reference total impulse response signal associated with the electronic device.

The above mentioned features of the method, when applicable, apply to this second aspect as well. In order to avoid undue repetition, reference is made to the above.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects of the present invention will now be described in more detail, with reference to appended drawings showing embodiments of the invention. The figures should not be considered limiting the invention to the specific embodiment; instead they are used for explaining and understanding the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

Figure 1:
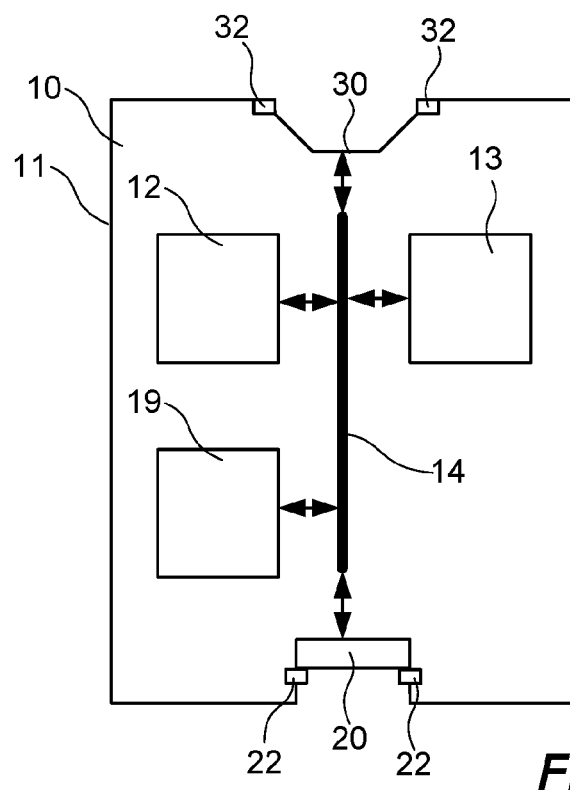
FIG. 1 is a cross sectional schematic view of an electronic device.

FIG. 1 is a cross sectional schematic view of a water resistant electronic device 10. Non-limiting examples of the electronic device 10 are mobile phones, tablets, laptops and smart watches. The electronic device 10 comprises a processing unit 12, a digital data storage 13, an internal data bus 14. A housing 11 is enclosing the processing unit 12, the digital data storage 13, the internal data bus 14. The electronic device 10 further comprises a microphone 20 and a loudspeaker 30.

The processing unit 12, the digital data storage 13, the microphone 20 and the loudspeaker 30 communicate via the internal data bus 14.

The housing 11 does not need to be the outer shell of the electronic device 10. It might be an internal housing located inside an outer shell of the electronic device 10. However, the housing 11 may as well be the outer most shell of the electronic device 10.

The microphone 20 is attached to the housing 11 at a first opening thereof via a microphone seal 22. The loudspeaker 30 is attached to the housing 11 at a second opening thereof via a loudspeaker seal 32. The microphone seal 22 and the loudspeaker seal 32 prevent water from entering the interior of the electronic device 10. Hence, the microphone seal 22 and the loudspeaker seal 32 provide water resistant features for the electronic device. Non limiting examples of seals that may be used are Gore Vents, Porex, PUW, Neutek, Poron® and Temish by Nitto Denko.

Since the water resistant electronic device 10 then becomes hermetically closed, the interior of the electronic device 10 acts as an internal acoustical chamber. Besides providing water resistance, the microphone seal 22 and the loudspeaker seal 32 is also arranged to provide a sonic seal. The loudspeaker seal 32 reduces the amount of sound energy, which is produced by the loudspeaker 30, finding its way into the internal acoustical chamber. Sound from the loudspeaker entering into the interior of the electronic device cause so called raw echo inside the electronic device 10. Hence, a well working loudspeaker seal 32 reduces the raw echo inside the electronic device 10. The microphone seal 22 reduces the leakage of raw echo from inside the electronic device 10 to the microphone 20. Hence, a well working microphone seal 22 reduces the raw echo picked up by the microphone 20.

Despite the loudspeaker seal 32 and the microphone seal 22 raw echo may anyway end up at the microphone 20 and being recorded thereby. Such recorded raw echo may introduce problems with sound echo recorded by the microphone 20. An echo canceller 19 may be used to cancel out such sound echo signal recorded by the microphone 20. The echo canceller 19 may be hardware and/or software implemented.

However, if sealing of the microphone 20 or the loudspeaker 30 is not fully functional, besides reduced water resistance, also an increase in the recording of raw echo by the microphone 20 may be introduced. The increase in raw echo experienced by the microphone 20 may be due a bad loudspeaker seal 32 leading to increased leakage of sound emitted by the loudspeaker 30 into the electronic device 10 acting as the acoustical chamber. Alternately or in combination, the increase in raw echo experienced by the microphone 20 may be due a bad microphone seal 22 leading to increased leakage of raw echo out from the electronic device 10 acting as the acoustical chamber to the microphone 20.

The digital data storage 13, being a non-transitory computer-readable recording medium, is arranged to have recorded thereon a program which when executed on the processor 12 of the electronic device 10 is arranged for implementing a method for diagnosing sealing properties of the microphone and/or loudspeaker seals 22, 32 in an electronic device 10.

Figure 2:
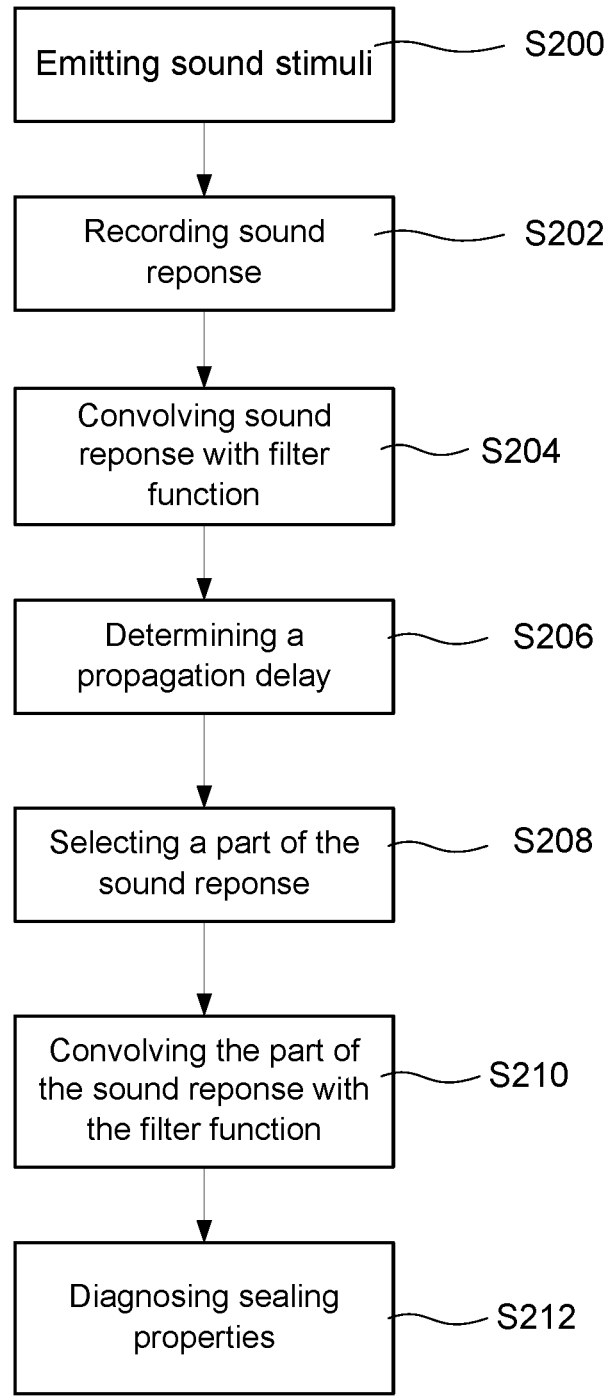
FIG. 2 is a block scheme of a method for diagnosing sealing properties of microphone and/or loudspeaker seals in an electronic device.

With reference to FIG. 2 the method comprises the following acts. Emitting S200 from the loudspeaker 30 a sound stimuli based on a sweeping frequency described by one or more continuous time vs. frequency functions. Recording S202, by the microphone 20, a sound response. The sound response being recorded simultaneously with the emitting S200 of the sound stimuli. Convolving S204 the sound response with a filter function. The filter function being a representation of the one or more continuous time vs. frequency functions. As a result of the convolving S204 a preliminary impulse response signal is obtained. The preliminary impulse response signal representing a preliminary impulse response correlation between the sound response and the filter function over time. Determining S206, using the preliminary impulse response signal, a propagation delay through the electronic device 10. The propagation delay being a propagation delay for sound impulses from between the loudspeaker 30 and the microphone 20 through the electronic device 10. Selecting S208, based on the propagation delay, a part of the sound response corresponding in time to the sound stimuli. Convolving S210 the part of the sound response corresponding in time to the sound stimuli with the filter function. As a result of this second convolving S210 a total impulse response signal is obtained. The total impulse response signal representing a total impulse response correlation between the part of the sound response corresponding in time to the sound stimuli and filter function over time. Diagnosing S212 sealing properties of the microphone and/or loudspeaker seals 22, 32 by comparing a representation of the total impulse response signal with a representation of a predetermined reference total impulse response signal associated with the electronic device 10.

The wording "associated with the electronic device" should be construed as something associated with the specific electronic device or as something associated with the type of electronic device this specific electronic device belongs to. The later may e.g. be a specific model of an electronic device, e.g. Sony Xperia Z5.

The representation of the predetermined reference total impulse response signal associated with the electronic device 10 may be determined in various ways. Some non-limiting examples:

Running acts S200-S210 of the above method when the electronic device 10 is started the first time as a part of a configuration of the electronic device 10. The configuration is resulting in gaining the total impulse response signal. A representation of the total impulse response signal may then be stored in the digital data storage 13 of the electronic device 10 as the representation of the predetermined reference total impulse response signal. Alternatively or in combination, the representation of the total impulse response signal may be stored else ware, e.g. in the cloud or on a server accessible by the electronic device 10. According to this approach, it is assumed that the microphone and loudspeaker seals 22, 32 are fully functional at the time of configuration of the electronic device 10. Moreover, according to this approach the predetermined reference total impulse response signal associated with the electronic device 10 is a device specific predetermined reference total impulse response signal.

Alternatively, it may be assumed that all electronic devices of a type of electronic devices, e.g. Sony Xperia Z5, should have the same predetermined reference total impulse response signal. The predetermined reference total impulse response signal for that type of electronic device may then be centrally determined by e.g. the manufacturer of the electronic device 10. The predetermined reference total impulse response signal may also according to this approach be locally stored at each electronic device. Alternatively or in combination, the predetermined reference total impulse response signal may be stored else ware, e.g. in the cloud or on a server accessible by the electronic device 10. Hence, according to this approach the predetermined reference total impulse response signal associated with the electronic device 10 is a device type specific predetermined reference total impulse response signal.

As a non-limiting example, the sound stimuli may be in the form of a constant-amplitude sine-wave with continuously increasing frequency. The frequency may increases or decrease exponentially with time. Typically the sound stimuli sweep from 0 frequency to half the sampling rate. However, it is possible to use other frequency ranges. A minimum frequency range for the one or more continuous time vs. frequency functions is at least one octave.

The filter function may be an in time reversed representation of the one or more continuous time vs. frequency functions. Hence, an in time reversed version of the sound stimuli. This may e.g. be referred to as an inverse filter. As a non-limiting example, the inverse filter is a signal over time that is created from the sound stimuli by two operations: A) The sound stimuli is time reversed, that is "played backwards", and B) the amplitude is changed over time to make the magnitude spectrum (in the frequency range of interest) follow a sloping straight line when plotted in a diagram with logarithmic level and frequency axes. The slope may e.g. be +10 dB/decade. It is however realized that other slopes may as well be used. Hence, the inverse filter may further defined by an over time changing amplitude.

The convolution of the recorded sound response with the filter function may be made either in the time domain or in the frequency domain. However, doing a convolution in the frequency domain is most often computationally more efficient.

According to the above, the result of the convolving S204 of the sound response with the filter function is a time domain preliminary impulse response signal. The preliminary impulse response signal usually comprises a spike followed by a reverberation tail. The time axis location of the spike corresponds to the propagation delay between the loudspeaker 30 and the microphone 20 through the electronic device 10. For exponentially swept sine functions, any harmonic distortion will result in smaller spikes preceding a main spike. The main spike corresponds to the linear (fundamental) response between the loudspeaker 30 and the microphone 20 through the electronic device 10. Hence, from the preliminary impulse response signal a propagation delay may be determined.

Using the determined propagation delay the part of the recorded sound response that corresponds in time to the sound stimuli may be selected and retained. The part of the recorded sound response that corresponds in time to the sound stimuli may be referred to as a trimmed output signal.

According to the above, the trimmed output signal is convolved S210 with the inverse filter obtaining the total impulse response signal. In order to obtain a less noisy total impulse response signal a time window may be applied to the preliminary impulse response signal before the act of convolving S210. This in order to eliminate all but the interesting part of the time signal, namely the spike(s) and its (their) corresponding reverberation tail. If so desired, the harmonic distortion products can also be excluded from the calculation by setting an appropriate time window.

The comparing of the representation of the total impulse response signal with the representation of the predetermined reference total impulse response signal associated with the electronic device may comprise transforming the total impulse response signal from the time domain to a frequency domain; and in the frequency domain, comparing the total impulse response signal with a frequency domain representation of the predetermined reference total impulse response signal. The transforming of the total impulse response signal from the time domain to the frequency domain may be made using a Fourier Transformation, preferably a Discrete Fourier Transformation.

By using the Discrete Fourier Transformation the total impulse response signal is represented in the frequency domain as a frequency response. For each point on the frequency axis, the frequency response is proportional to the input-to-output sensitivity of the measured loudspeaker-microphone system. In other words the frequency response is a representation of the system transfer function. The frequency response curve of the electronic device 10 under test may be conveniently compared to previously acquired reference frequency responses from known good units of the same type. This is above referred to as the act of diagnosing S212.

The person skilled in the art realizes that the present invention by no means is limited to the preferred embodiments described above. On the contrary, many modifications and variations are possible within the scope of the appended claims.

Figure 3:
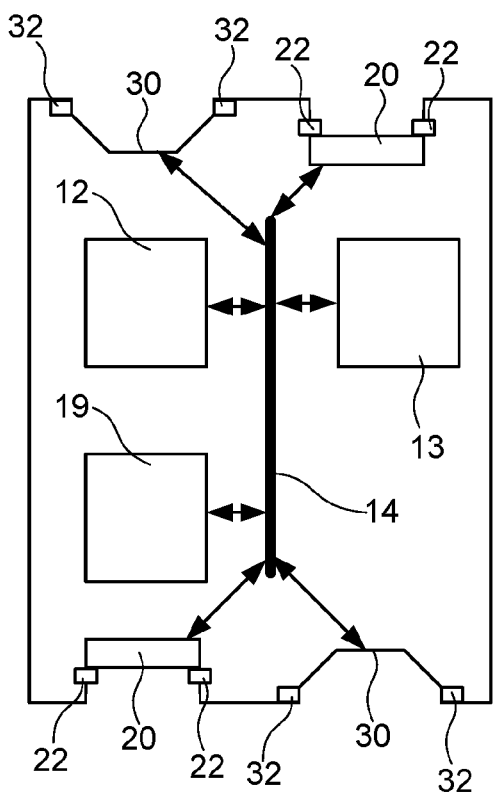
FIG. 3 is a cross sectional schematic view of an alternative of an electronic device.

For example, the electronic device may comprise a plurality of loudspeakers 30 and/or a plurality of microphones 20. An example of such an electronic device 10' is illustrated in FIG. 3. According to this embodiment the electronic device 10' comprises two loudspeakers 30 and two microphones 20. However, any number of loudspeakers 30 or microphones 20 may be used in connection with the current invention. The electronic device 10' is provided with a microphone seal 22 at each interface between one of the pluralities of microphones 20 and the housing 11 and with a loudspeaker seal 32 at each interface between one of the pluralities of loudspeakers 30 and the housing 11. When diagnosing this embodiment of the electronic device 10', and also other embodiments of electronic devices having a plurality of loudspeakers 30 and/or a plurality of microphones 20 the acts S200-S212 are repeated for microphone and loudspeaker combinations of the electronic device.

In the embodiments discussed above, the acts S204-S212 are implemented as software programs portions being executed on a processor. However, one or more of the above act or parts of acts may as well be implemented in dedicated hardware arranged in the electronic device 10 or hardware being arranged in devices being in data communication with the electronic device 10.

Additionally, variations to the disclosed embodiments can be understood and effected by the skilled person in practicing the claimed invention, from a study of the drawings, the disclosure, and the appended claims.

The invention claimed is:

1. A method for diagnosing sealing properties of microphone and/or loudspeaker seals in an electronic device, the electronic device comprising a housing, a loudspeaker and a microphone, the electronic device being provided with a microphone seal at an interface between the microphone and the housing and/or a loudspeaker seal at an interface between the loudspeaker and the housing, the method comprising:
   a) emitting from the loudspeaker, a sound stimuli based on a sweeping frequency described by one or more continuous time vs. frequency functions;
   b) recording, by the microphone, a sound response simultaneously with the emitting of the sound stimuli;
   c) convolving the sound response with a representation of the one or more continuous time vs. frequency functions to obtain a preliminary impulse response signal representing a preliminary impulse response correlation between the sound response and the representation of the one or more continuous time vs. frequency functions over time;
   d) determining, using the preliminary impulse response signal, a propagation delay through the electronic device;
   e) selecting, based on the propagation delay, a part of the sound response corresponding in time to the sound stimuli;
   f) convolving the part of the sound response corresponding in time to the sound stimuli with the representation of the one or more continuous time vs. frequency functions to obtain a total impulse response signal representing a total impulse response correlation between the part of the sound response corresponding in time to the sound stimuli and the representation of the one or more continuous time vs. frequency functions over time; and g) diagnosing sealing properties of the microphone and/or loudspeaker seals by comparing a representation of the total impulse response signal with a representation of a predetermined reference total impulse response signal associated with the electronic device.

2. The method according to claim 1, wherein the representation of the one or more continuous time vs. frequency functions is an inverse filter represented as an in time reversed version of the sound stimuli.

3. The method according to claim 2, wherein the inverse filter is further defined by an over time changing amplitude.

4. The method according to claim 1, wherein the comparing of the representation of the total impulse response signal with the representation of the predetermined reference total impulse response signal associated with the electronic device comprises:
   transforming the total impulse response signal from the time domain to a frequency domain; and
   in the frequency domain, comparing the total impulse response signal with a frequency domain representation of the predetermined reference total impulse response signal.

5. The method according to claim 4, wherein the transforming of the total impulse response signal from the time domain to the frequency domain is made using a Fourier Transformation, preferably a Discrete Fourier Transformation.

6. The method according to claim 1, wherein a minimum frequency range for the one or more continuous time vs. frequency functions is at least one octave.

7. The method according to claim 1, wherein at least one of the one or more continuous time vs. frequency functions is a logarithmic function.

8. The method according to claim 1, wherein the electronic device comprises a plurality of loudspeakers and/or a plurality of microphones, wherein the electronic device is provided with a microphone seal at each interface between one of the pluralities of microphones and the housing and with a loudspeaker seal at each interface between one of the pluralities of loudspeakers and the housing, and wherein acts a)-g) are repeated for microphone and loudspeaker combinations of the electronic device.

9. A non-transitory computer-readable recording medium having recorded thereon a program which when executed on an electronic device having processing capabilities is arranged for implementing:
   a) emitting, from a loudspeaker of the electronic device, a sound stimuli based on a sweeping frequency described by one or more continuous time vs. frequency functions;
   b) recording, by a microphone of the electronic device, a sound response simultaneously with the emitting of the sound stimuli;
   c) convolving the sound response with a representation of the one or more continuous time vs. frequency functions to obtain a preliminary impulse response signal representing a preliminary impulse response correlation between the sound response and the representation of the one or more continuous time vs. frequency functions over time;
   d) determining, using the preliminary impulse response signal, a propagation delay through the electronic device;
   e) selecting, based on the propagation delay, a part of the sound response corresponding in time to the sound stimuli;
   f) convolving the part of the sound response corresponding in time to the sound stimuli with the representation of the one or more continuous time vs. frequency functions to obtain a total impulse response signal representing a total impulse response correlation between the part of the sound response corresponding in time to the sound stimuli and the representation of the one or more continuous time vs. frequency functions over time; and
   g) diagnosing sealing properties of a microphone seal of the electronic device and/or sealing properties of a loudspeaker seal of the electronic device, wherein the microphone seal is arranged at an interface between the microphone and a housing of the electronic device and wherein the loudspeaker seal is arranged at an interface between the loudspeaker and the housing of the electronic device, by comparing a representation of the total impulse response signal with a representation of a predetermined reference total impulse response signal associated with the electronic device.

10. The non-transitory computer-readable recording medium according to claim 9, wherein the representation of the one or more continuous time vs. frequency functions is an inverse filter represented as an in time reversed sound stimuli.

11. The non-transitory computer-readable recording medium according to claim 9, wherein the comparing of the representation of the total impulse response signal with the representation of the predetermined reference total impulse response signal associated with the electronic device comprises:
   transforming the total impulse response signal from the time domain to a frequency domain; and
   in the frequency domain, comparing the total impulse response signal with a frequency domain representation of the predetermined reference total impulse response signal.

12. The non-transitory computer-readable recording medium according to claim 11, wherein the transforming of the correspondence signal from the time domain to the frequency domain is made using a Fourier transformation, preferably an inverse Fourier transformation.

13. The non-transitory computer-readable recording medium according to claim 9, wherein the electronic device comprises a plurality of loudspeakers and/or a plurality of microphones, wherein the electronic device is provided with a microphone seal at each interface between one of the pluralities of microphones and the housing and with a loudspeaker seal at each interface between one of the pluralities of loudspeakers and the housing, and wherein a)-g) are repeated for microphone and loudspeaker combinations of the electronic device.

* * * * *